(12) United States Patent
Kim et al.

(10) Patent No.: US 12,504,365 B2
(45) Date of Patent: Dec. 23, 2025

(54) METHOD FOR QUANTIFYING CONTENT OF WATER AND LIPID IN TURBID MEDIA, USING NARROWBAND DIFFUSE REFLECTANCE SPECTROSCOPY

(71) Applicant: MEDITHINGS CO., LTD., Seoul (KR)

(72) Inventors: Se Hwan Kim, Seongnam-si (KR); Jesse Hou Lam, Seoul (KR); A Ram Kim, Seoul (KR)

(73) Assignee: MEDITHINGS CO., LTD., Seoul (KR)

( * ) Notice: Subject to any disclaimer, the term of this patent is extended or adjusted under 35 U.S.C. 154(b) by 215 days.

(21) Appl. No.: 18/263,990

(22) PCT Filed: Jan. 18, 2022

(86) PCT No.: PCT/KR2022/000921
§ 371 (c)(1),
(2) Date: Aug. 2, 2023

(87) PCT Pub. No.: WO2022/181994
PCT Pub. Date: Sep. 1, 2022

(65) Prior Publication Data
US 2024/0110865 A1  Apr. 4, 2024

(30) Foreign Application Priority Data
Feb. 26, 2021 (KR) .................. 10-2021-0026703

(51) Int. Cl.
*G01N 21/3577* (2014.01)
*G01N 33/483* (2006.01)

(52) U.S. Cl.
CPC ..... *G01N 21/3577* (2013.01); *G01N 33/4833* (2013.01); *G01N 2201/08* (2013.01)

(58) Field of Classification Search
CPC ........... G01N 21/3577; G01N 33/4833; G01N 2201/08; G01N 21/359; A61B 5/0075; A61B 5/4875; A61B 5/4872
See application file for complete search history.

(56) References Cited

U.S. PATENT DOCUMENTS

2017/0209089 A1    7/2017   Warren et al.

FOREIGN PATENT DOCUMENTS

| JP | 2016-511015 A | 4/2016 |
| JP | 2017-187493 A | 10/2017 |

(Continued)

OTHER PUBLICATIONS

Greening et al., "Sampling depth of a diffuse reflectance spectroscopy probe for invivo physiological quantification of murine subcutaneous tumor allografts", Journal of Biomedical Optics, vol. 23, No. 8, pp. 085006-1 to085006-14. (Year: 2018).*

(Continued)

*Primary Examiner* — Kiho Kim
(74) *Attorney, Agent, or Firm* — HARNESS, DICKEY & PIERCE, P.L.C.

(57) ABSTRACT

Proposed is a method for quantifying water and lipid contents in turbid media. Methods for quantifying water and lipid contents through non-invasive methods in turbid media in which scattering occurs upon penetration of near-infrared rays have yet to be proposed. In addition, existing apparatuses and methods for measuring body composition use frequency-domain and time-domain diffuse optical spectroscopy or infrared spectroscopy to measure water and lipid contents in tissue, whereby there are limitations that hardware configurations become complicated, and mass production and sales are subject to constraints. To solve such problems, proposed is a method for quantifying water and lipid contents in turbid media using narrowband diffuse (Continued)

reflectance spectroscopy, which uses only a near-infrared band in a range of 900 to 1,000 nm, configured such that the water and lipid contents can be accurately quantified in tissue through a simpler configuration than that in existing methods.

5 Claims, 9 Drawing Sheets

(56) References Cited

FOREIGN PATENT DOCUMENTS

| KR | 10-2016-0019777 A | 2/2016 |
| KR | 10-2017-0039168 A | 4/2017 |
| KR | 101951758 B1 | 2/2019 |

OTHER PUBLICATIONS

International Search Report for International Application No. PCT/KR2022/000921 dated May 2, 2022.

* cited by examiner

| Phantom | Oil (mL) | Water (mL) | $R_{FAT}$ | $R_{H2O}$ |
|---|---|---|---|---|
| P1 | 520 | 130 | 0.8 | 0.2 |
| P2 | 455 | 195 | 0.7 | 0.3 |
| P3 | 390 | 260 | 0.6 | 0.4 |
| P4 | 325 | 325 | 0.5 | 0.5 |
| P5 | 260 | 390 | 0.4 | 0.6 |

METHOD FOR QUANTIFYING CONTENT OF WATER AND LIPID IN TURBID MEDIA, USING NARROWBAND DIFFUSE REFLECTANCE SPECTROSCOPY

CROSS-REFERENCE TO RELATED APPLICATIONS

This application is a national phase under 35 U.S.C. § 371 of PCT International Application No. PCT/KR2022/000921 which has an International filing date of Jan. 18, 2022, which claims priority to Korean Application No. 10-2021-0026703, filed Feb. 26, 2021, the entire contents of each of which are hereby incorporated by reference.

TECHNICAL FIELD

The present disclosure relates to a method for quantifying water and lipid contents in turbid media. More specifically, to solve problems in existing apparatuses and methods for measuring body composition, which have failed to provide methods capable of quantifying the water and lipid contents through non-invasive methods in turbid media, such as bodily tissues, in which scattering occurs upon penetration of near-infrared rays (NIR), the present disclosure relates to a method for quantifying the water and lipid contents in turbid media by using narrowband diffuse reflectance spectroscopy (DRS). The narrowband DRS is configured such that the water and lipid contents in tissue can be accurately quantified using NIR-based diffuse reflectance spectroscopy (DRS).

In addition, existing spectroscopy uses frequency-domain and time-domain diffuse optical spectroscopy (DOS) or infrared spectroscopy to measure water and lipid contents in tissue, whereby there are limitations that hardware configurations become complicated, and mass production and sales are subject to constraints. To solve problems in the existing spectroscopy as well as in apparatus and methods for measuring body composition based on the same, the present disclosure relates to a method for quantifying the water and lipid contents in turbid media by using narrowband DRS, which uses only a near-infrared band in a range of 900 to 1,000 nm. The narrowband DRS is configured such that the water and lipid contents can be accurately quantified in tissue through a simpler configuration than that in existing methods.

BACKGROUND ART

Typically, optical detection of water and fat is crucial in understanding tissue structures and physiological responses. That is, water and fat can be, for example, used as key biomarkers in breast cancer research for determining the resection margin by monitoring tumors and differentiating tissue types.

In addition, there has been a recently growing interest in the quantification of water and fat in tissue in various fields, for example, the field of sports medicine for fitness and weight loss, the field of emergency medicine for regulating patient hydration, the field of cosmetics and dermatological treatment, and the like.

However, despite the importance of the quantification of water and fat in tissue, existing apparatus for quantifying water and fat in tissue has factors that disturb the quantification of body composition (weight, size, cost, and the like).

More specifically, the "gold standard" equipment available in modern medicine includes magnetic resonance imaging (MRI), computed tomography (CT), dual-energy X-ray absorption, and the like. In this case, one of the simplest methods of estimating body fat is a method using skinfold calipers. However, the method using such skinfold calipers are debatable in terms of reproducibility and accuracy.

In addition, even though a body impedance device configured to estimate body composition by measuring the impedance generated when a minute current is supplied to the human body has been recently proposed, this device is difficult to be used when measurement of a specific tissue part is required, which is disadvantageous.

Hence, accurate and non-invasive methods that have a low barrier of entry are required to expand the application of tissue compositional analysis to a routine clinical procedure or a personal health procedure.

In this case, existing near-infrared (NIR) tissue spectroscopy has been proven to be suitable as a non-invasive optical modality, especially for detecting water and fat in biological scattering media.

That is, while visible light and infrared interrogating light are typically limited to the dermal layer due to strong water absorption, light sources with near-infrared wavelengths (in a range of 600 to 1000 nm) fall within the spectral window in which light can deeply penetrate fat and muscle tissue.

However, the NIR apparatus that determines water and fat in tissue is based on frequency-domain and time-domain diffuse optical spectroscopy (DOS). Accordingly, complicated devices, such as high-frequency modulation generators or picosecond photon detectors, are involved, making entry to the mass market difficult.

In addition, continuous-wave methods that are advantageous in multiple spectral features of absorbing water and fat within a wavelength window in a range of 900 to 1600 nm have been proposed in the related art. However, in order to use infrared spectroscopy, detectors, such as indium-gallium-arsenide (InGaAs) spectrometers, that are operable in sub-zero conditions are required. Furthermore, absorption by water at 1000 nm or higher limits the optical interrogation depth, making deeper access through the skin and subcutaneous layer difficult.

Hence, to solve problems in the related art, as described above, it is preferable to propose diffuse reflection spectroscopy (DRS) apparatus with a simplified hardware configuration for estimating water and fat contents in tissue and methods, based on the description presented previously in the related art. However, any apparatus or method that satisfies all such demands is yet to be presented.

DISCLOSURE

Technical Problem

The present disclosure has been proposed to solve problems in the related art, as described above. To solve the problems in existing apparatuses and methods for measuring body composition, which have failed to provide methods capable of quantifying water and lipid contents through non-invasive methods in turbid media, such as bodily tissues, in which scattering occurs upon penetration of near-infrared rays (NIR), an objective of the present disclosure is to provide a method for quantifying water and lipid contents in turbid media by using narrowband diffuse reflectance spectroscopy (DRS). The narrowband DRS is configured such that the water and lipid contents in tissue can be accurately quantified using NIR-based diffuse reflectance spectroscopy (DRS).

In addition, existing spectroscopy uses frequency-domain and time-domain diffuse optical spectroscopy (DOS) or infrared spectroscopy to measure water and fat contents in tissue, whereby there are limitations that hardware configurations become complicated, and mass production and sales are subject to constraints. To solve the problems in the existing spectroscopy as well as in apparatus and methods for measuring body composition based on the same, the present disclosure relates to a method for quantifying the water and lipid contents in turbid media by using narrowband DRS, which uses only a near-infrared band in a range of 900 to 1,000 nm. The narrowband DRS is configured such that the water and lipid contents can be accurately quantified in tissue through a simpler configuration than that in existing methods.

Technical Solution

In order to accomplish the above objectives, according to the present disclosure, provided is a method for quantifying water and lipid contents in a turbid medium using narrowband diffuse reflectance spectroscopy. The narrowband diffuse reflectance spectroscopy is configured such that the water and lipid contents in a tissue are able to be accurately quantified in the turbid medium, in which scattering occurs upon penetration of near-infrared rays (NIR), using diffuse reflectance spectroscopy (DRS) based on the near-infrared rays (NIR). The method is configured to be performed using a data processing means, including a computer or dedicated hardware, through a process including: a step of measuring a diffuse reflectance of a measurement target using diffuse reflectance spectroscopy (DRS); and a step of analyzing collected measurement data measured in the measuring step to calculate water and lipid contents of the measurement target. In the measuring step, frequency-domain photon migration (FDPM) measurement is configured to be performed on the measurement target by using only a near-infrared band in a range of 900 to 1000 nm.

In this case, the measuring step is configured to be performed using a DRS device. The DRS device is configured to include: a polylactic acid (PLA) probe mounted with a source optical fiber connected to a light source and a detection optical fiber of a spectrometer and having a form in which the optical fibers are spaced apart from each other by a predetermined distance; and a barrier formed of transparent plastic with a predetermined thickness, the barrier being positioned between the probe and the surface of the measurement target to prevent the measurement target and each of the optical fibers from making contact.

In addition, the analyzing step is configured such that when a theoretical reflectance of the measurement target is referred to as R, the measured reflectance is referred to as Rm, absorption of the measurement target is referred to as $\mu_a$, and reduced scattering of the measurement target is referred to as $\mu'_s$ ($\mu'_s \gg \mu_a$), a process of selecting $\mu_a$ and calculating a $\mu_a$ spectrum so that a difference between the theoretical reflectance (R) and the measured reflectance (Rm) is minimized is performed by using the following equation, assuming $\mu'_s = 1.0$ mm$^{-1}$, and applying a numerical solver, including MATLAB function fzero.

$$\text{fzero}[R_m(\lambda) - R(\lambda, \mu_a)]$$

Furthermore, the analyzing step is configured such that each process of calculating a water concentration ($C_{H2O}$) and a lipid concentration ($C_{FAT}$) of the measurement target is performed by comparing the $\mu_a$ calculated using the above equation and an absorption spectrum $\mu_{a,fit}$ predicted using the following equation, using a least-square minimization (LSM) method.

$$\mu_{a,fit} = \varepsilon_{H2O} C_{H2O} + \varepsilon_{FAT} C_{FAT} + SF$$

(Here, $C_{H2O}$, $\varepsilon_{H2O}$, $C_{FAT}$, $\varepsilon_{FAT}$, and SF mean a concentration of H2O, an extinction coefficient of H2O, a concentration of FAT, an extinction coefficient of FAT, and a scaling factor, respectively.

Moreover, the analyzing step is configured such that when a water fraction ratio of the measurement target is referred to as $R_{H2O}$ and a fat fraction ratio of the measurement target is referred to as $R_{FAT}$, each process of calculating the water fraction ratio and the fat fraction ratio of the measurement target is performed using the following equation.

$$R_{H2O} = \frac{C_{H2O}}{(C_{H2O} + C_{FAT})}, R_{FAT} = \frac{C_{FAT}}{(C_{H2O} + C_{FAT})}$$

In addition, according to the present disclosure, provided is a computer-readable recording medium on which a program configured to execute the method described above.

Furthermore, according to the present disclosure, provided is a body composition measuring device including: a measurement unit configured to measure water and lipid contents of a measurement target; and an output unit including a display or an output means configured to display and deliver a measurement result obtained from the measurement unit. The measurement unit is configured to measure the water and lipid contents of the measurement target using the method described above.

Moreover, according to the present disclosure, provided is a method for measuring a body composition, the method including: a step of constructing a body composition measurement system configured to measure water and lipid contents of a measurement target using the method of any one of claims 1 to 5; and a step of measuring the water and lipid contents of the measurement target using the body composition measurement system.

Advantageous Effects

As described above, according to the present disclosure, provided is a method for quantifying water and lipid contents in turbid media using narrowband diffuse reflectance spectroscopy (DRS). The narrowband DRS is configured such that the water and lipid contents can be accurately quantified in tissue using DRS based on near-infrared rays (NIR). As a result, problems in existing apparatuses and methods for measuring body composition, which have failed to provide methods capable of quantifying the water and lipid contents through non-invasive methods in turbid media, such as bodily tissues, in which scattering occurs upon penetration of near-infrared rays (NIR), can be solved.

In addition, according to the present disclosure, as described above, provided is a method for quantifying water and lipid contents in turbid media using narrowband DRS which uses only a near-infrared band in a range of 900 to 1,000 nm. The narrowband DRS is configured such that the water and lipid contents can be accurately quantified in tissue through a simpler configuration than that in existing methods. As a result, problems in existing spectroscopy, which uses frequency-domain and time-domain diffuse optical spectroscopy (DOS) or infrared spectroscopy to measure the water and fat contents in tissue, whereby there are limitations that hardware configurations are complicated, and mass production and sales are subject to constraints, as well as in apparatus and methods for measuring body composition based on the same, can be solved.

BEST MODE

Hereinafter, a specific embodiment of a method for quantifying water and lipid contents in turbid media, using narrowband diffuse reflection spectroscopy according to the present disclosure, will be described with reference to the accompanying drawings.

Here, it is to be noted that the content described below is only one embodiment for carrying out the present disclosure, and the present disclosure is not limited to the content of the embodiment described below.

In addition, in the description of the embodiment of the present disclosure below, in order to simplify the description, to be noted that the detailed description for parts that are identical or similar to the contents in the related art that are determined to be easily understood and implemented at the level of those skilled in the art has been omitted.

That is, as described later, to solve problems in existing apparatuses and methods for measuring body composition, which have failed to provide methods capable of quantifying water and lipid contents through non-invasive methods in turbid media, such as bodily tissues, in which scattering occurs upon penetration of near-infrared rays (NIR), the present disclosure relates to a method for quantifying the water and lipid contents in turbid media by using narrowband diffuse reflectance spectroscopy (DRS). The narrowband DRS is configured such that the water and lipid contents in tissue can be accurately quantified using diffuse reflectance spectroscopy based on near-infrared rays.

In addition, existing spectroscopy uses frequency-domain and time-domain diffuse optical spectroscopy (DOS) or infrared spectroscopy to measure the water and fat contents in tissue, whereby there are limitations that hardware configurations are complicated, and mass production and sales are subject to constraints. To solve problems in the existing spectroscopy as well as in apparatus and methods for measuring body composition based on the same, the present disclosure relates to a method for quantifying the water and lipid contents in turbid media by using narrowband DRS, which uses only a near-infrared band in a range of 900 to 1,000 nm. The narrowband DRS is configured such that the water and fat contents can be accurately quantified in tissue through a simpler configuration than that in existing methods.

Subsequently, details of the method for quantifying the water and lipid contents in the turbid media using the narrowband diffuse reflectance spectroscopy, according to the present disclosure, will be described with reference to the drawings.

That is, the inventors of the present disclosure proposed the method for quantifying the water and lipid contents in the turbid medium using the narrowband diffuse reflection spectroscopy, which used only the near-infrared band in a range of 900 to 1000 nm. The narrowband DRS was configured such that the water and fat contents were allowed to be accurately quantified in tissue through a simpler configuration than that in existing methods, as described later. To verify the actual performance, measurements were performed on turbid emulsion phantoms with varying mixing ratios of water and oil components for different scattering assumptions in the medium. Then, the measurement results were validated against an existing frequency-domain photon migration (FDPM) system, a representative method capable of quantifying water and fat in turbid media in the related art, using a near-infrared light source at a wavelength in a range of 600 to 1000 nm.

Furthermore, as described later, the inventors of the present disclosure validated the performance of measuring water and fat in the quantification method using the narrowband diffuse reflectance spectroscopy according to the present disclosure, even in ex-vivo pig samples. To this end, the measurement results for the ex-vivo pig samples, according to the present disclosure, were verified against the results of extracting moisture directly from ex-vivo pig samples by an analytical chemical method.

Figure 1:
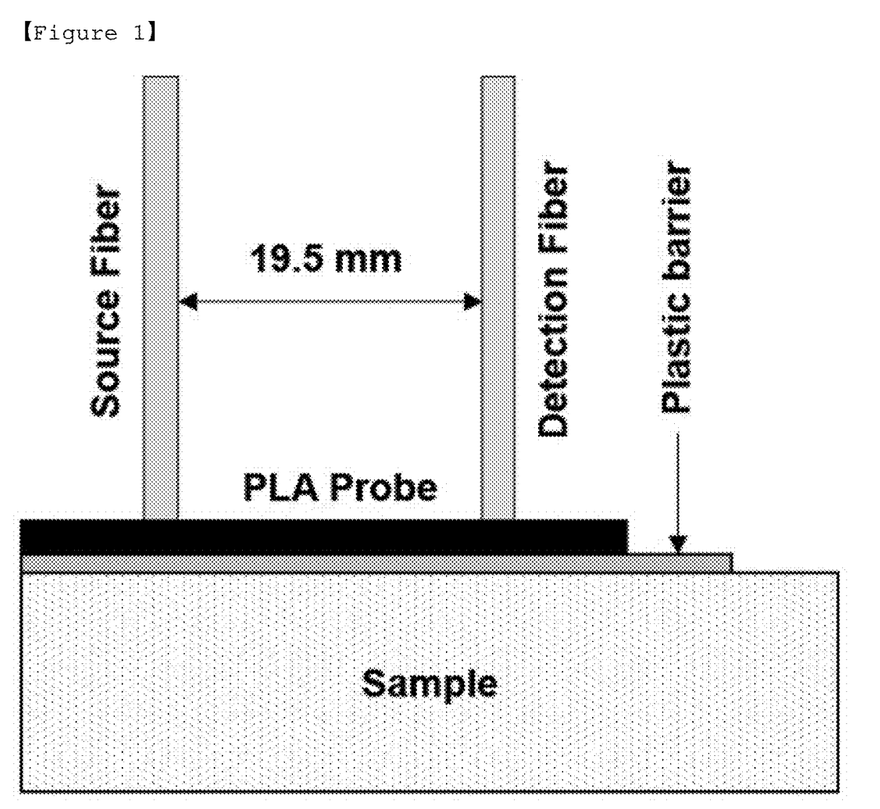
FIG. 1 is a diagram schematically illustrating a configuration for measuring emulsion phantoms and a pig sample in one embodiment of the present disclosure.

More particularly, referring to FIG. 1, first, FIG. 1 is a diagram schematically illustrating the configuration used for measuring the emulsion phantoms and the pig samples in one embodiment of the present disclosure.

In the configuration illustrated in FIG. 1, a source optical fiber connected to a tungsten-halogen lamp is fixed while being spaced apart from a detection optical fiber of a spectrometer, and the two types of optical fibers are mounted on a 3D-printed black probe. In addition, a transparent plastic barrier with a thickness of about 0.025 mm is configured to be positioned between the probe and the surface to be measured.

More specifically, in one embodiment of the present disclosure, DRS measurement was performed using a source optical fiber bundle (R Specialty Optical Fibers LLC, Williamsburg, VA) having a diameter of 3 mm and composed of a 50-μm optical fiber and a solid-core collection optical fiber having a diameter of 1 mm. The tungsten-halogen lamp (HL-2000-FHSA, Ocean Optics Inc., Largo, FL) provides steady-state broadband light while a spectrometer (HS2048XL-U2, Avantes, Apeldoorn, Netherlands) detects diffuse reflectance. The optical fibers were fixed on a 19.5-mm source-detector separator by a 3D-printed polylactic acid (PLA) probe. Calibration was performed based on the reflectance standard (SRS-02-020, Labsphere Inc., North Sutton, NH), and a thin transparent plastic barrier (about 0.025 mm) was positioned between the sample and the probe, as illustrated in FIG. 1, to prevent the sample and the surface of the optical fibers from making contact.

In addition, the transparent plastic barrier is present even during the calibration process. Frequency-domain photon migration (FDPM) data was captured from specific samples to show the impact of using measured scattering against the assumed scattering.

Here, FDPM is widely known through documents of the related art, that is, a non-invasive quantitative optical method in which laser light is modulated and detected in the MHz-to-GHz regime, in which the detected amplitude decay and phase-delayed optical parameters are analyzed so that reduced scattering ($\mu'_s$) and absorption ($\mu_a$) in the turbid medium can be calculated at the respective laser wavelengths. Hardware for FDPM is made up of a custom circuit used for controlling laser diodes having central laser wavelengths of 659 nm, 690 nm, 791 nm, and 829 nm, induced by using the optical fiber bundle combining a plurality of 400-μm optical fibers into a common output (R Specialty Optical Fibers LLC, Williamsburg, VA).

In addition, laser modulation sweeping the range of 50 to 500 MHz is provided by a network analyzer (TR1300/1, Copper Mountain Technologies, Indianapolis, Indiana). The detection of the modulated light is collected using an avalanche photodiode (S12023-10 with C5658, Hamamatsu Photonics K. K., Hamamatsu City, Japan). Furthermore, FDPM calibration was performed using a silicone-based phantom with characterized optical properties.

Moreover, the power law was used to calculate a scattering profile at a region in a range of 900 to 1000 nm. A laptop (HP Elitebook 735 G6, Hewlett-Packard, Palo Alto, CA) was used to operate the device, and data analysis was performed with custom MATLAB 2016a code and Microsoft Excel, using the same laptop.

Figure 2:
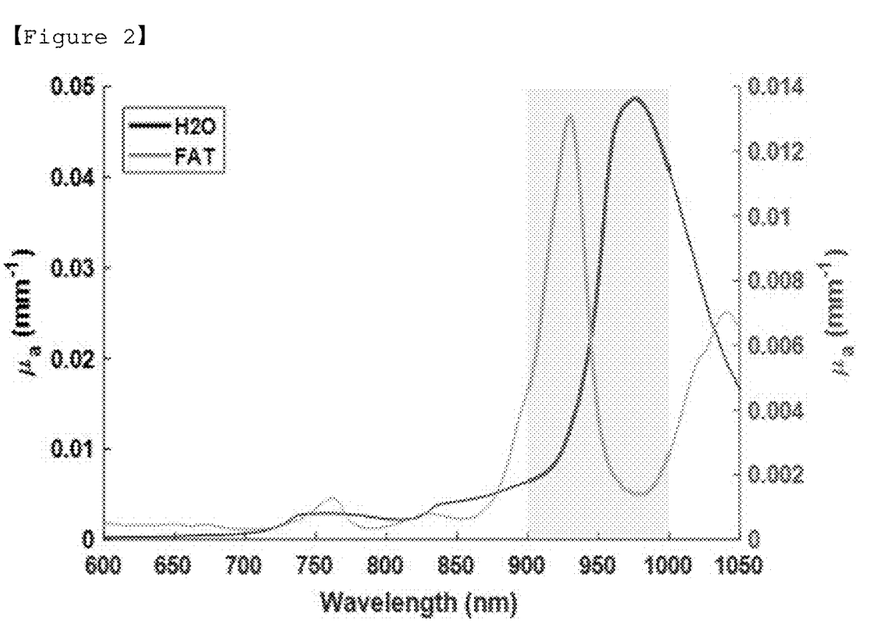
FIG. 2 is a diagram showing absorption coefficients of water (H2O) and lipid (FAT) in a wavelength range of 600 to 1050 nm.

Subsequently, to describe data processing, the inventors of the present disclosure used a DRS method according to one embodiment of the present disclosure to determine the water and fat contents of the sample being measured from a single source-detection pair. In this case, chromophore extinction coefficients of water (H2O) and lipid (FAT) were taken into account at a wavelength region in a range of 900 to 1000 nm. As shown in FIG. 2, H2O and FAT spectral peaks were included in such wavelength range.

That is, referring to FIG. 2, FIG. 2 is a diagram showing absorption coefficients of water (H2O) and lipid (FAT) in a wavelength range of 600 to 1050 nm.

In FIG. 2, the absorption coefficients of water (H2O) and lipid (FAT) are marked by a black line and a gray line, respectively, and data analysis in this operation was limited to a band in a range of 900 to 1000 nm, including the H2O and FAT spectral peaks, as highlighted.

In this case, a theoretical reflectance (R) of a turbid sample may be expressed using a diffusion model related to pa and P's with extrapolated boundary conditions, as shown in Equation 1 below.

$$R = c_1 \varphi + c_2 \Phi \quad \text{[Equation 1]}$$

In this case, c1 and c2 are constants related to an air-sample interface. In addition, a fluence $\varphi$ and a flux $\Phi$ are respectively as follows.

$$\varphi = \frac{1}{4\pi D}\left[\frac{\exp(-\mu_{eff} r_1)}{r_1} - \frac{\exp(-\mu_{eff} r_2)}{r_2}\right]$$

$$\Phi = \frac{1}{4\pi}\left[z_0\left(\mu_{eff} - \frac{1}{r_1}\right)\frac{\exp(-\mu_{eff} r_1)}{r_1^2} + (z_0 + 2z_b)\left(\mu_{eff} + \frac{1}{r_2}\right)\frac{\exp(-\mu_{eff} r_2)}{r_2^2}\right]$$

$$r_1 = \left(z_0^2 + \rho^2\right)^{\frac{1}{2}}$$

$$r_2 = \left[(2z_b + z_0)^2 + \rho^2\right]^{\frac{1}{2}}$$

Furthermore, a diffusion constant D satisfies $D = [3(\mu_a + \mu'_s)]^{-1}$, an effective attenuation $\mu_{eff}$ satisfies $\mu_{eff} = (\mu_a/D)^{1/2}$, an isotropic source depth $Z_0$ satisfies $Z_0 = 1/(\mu_a + \mu'_s)$, and a zero fluence extrapolated distance $z_b$ satisfies $z_b = (2D(1+R_{eff}))/(1-R_{eff})$.

In this case, $R_{eff}$ is a constant based on the refractive indices of air and the sample. In the application of this model, $\mu'_s$ is assumed to be much larger than $\mu_a$.

Moreover, a calibrated measured reflectance (Rm) is typically expressed as a unitless intensity. However, a $\mu_a$ spectrum may be calculated by applying a numerical solver, such as MATLAB function fzero, assuming $\mu'_s = 1.0$ mm$^{-1}$, as shown in Equation 2 below.

$$\text{fzero}[R_m(\lambda) - R(\lambda, \mu_a)] \quad \text{[Equation 2]}$$

In this case, R is the theoretical reflectance obtained from Equation 1 above. For each wavelength, the $\mu_a$ spectrum is generated by selecting $\mu_a$ and thus minimizing the difference between Rm and R. Such a $\mu_a$ spectrum may not be readily described as a true absolute unit due to the scattering assumptions. However, the shape of $\mu_a$ may still provide information regarding a relative chromophore concentration of the sample. In addition, lipid and water extinction coefficient peaks are included at a region in a range of 900 to 1000 nm, so the chromophore concentration may be obtained by matching the spectral features as shown in Equation 3 below.

$$\mu_{a,fit} = \varepsilon_{H2O} C_{H2O} + \varepsilon_{FAT} C_{FAT} + SF \quad \text{[Equation 3]}$$

That is, Equation 3 described above represents an absorption spectrum $\mu_{a,fit}$ expected as a result of a linear combination of the product of a concentration ($C_{H2O}$) and an extinction coefficient ($\varepsilon_{H2O}$) of H2O, the product of a concentration ($C_{FAT}$) and an extinction coefficient ($\varepsilon_{FAT}$) of FAT, and a scaling factor (SF). The $C_{H2O}$, $C_{FAT}$, and SF values may be obtained by a least-square minimization (LSM) method, which compares the $\mu_a$ predicted using Equation 3 described above and the $\mu_a$ calculated using Equation 2 described above.

In this case, the SF is an offset constant that does not depend on wavelength during the minimization process. Using such SF, the chromophore concentration may be obtained according to the shape of $\mu_a$, instead of the absolute value.

In the last step, a water fraction ratio $R_{H2O}$ is calculated by $R_{H2O} = C_{H2O}/(C_{H2O} + C_{FAT})$, and a fat fraction ratio is calculated by $R_{FAT} = C_{FAT}/(C_{H2O} + C_{FAT})$.

In addition, as described later, the method according to the present disclosure is relatively agnostic to absolute optical properties, so the selection of the $\mu'_s$ assumption does not necessarily matter. Furthermore, $R_{H2O}$ and $R_{FAT}$ are ratios based on the common $\mu_a$ spectrum, so the calculations thereof only require single-distance DRS measurement.

Next, to describe the emulsion phantom preparation, in one embodiment of the present disclosure, the inventors of the present disclosure used soy lecithin as an emulsifier to prepare a 650-mL emulsion phantom set (Wako Pure Chemical Industries, Ltd, Osaka, Japan) with varying ratios of soybean oil and distilled water. Each phantom was prepared as a water-in-oil emulsion. However, when increasing the water-to-lipid ratio of the emulsion phantom as suggested by the documents of the related art, scattering properties may be greatly increased, which is mainly attributable to the formation of an oil-in-water mixture. Therefore, as shown in the table of FIG. 3, an $R_{H2O}$ of up to 0.6 was obtained to keep all the phantoms as water-in-oil emulsions.

Figure 3:
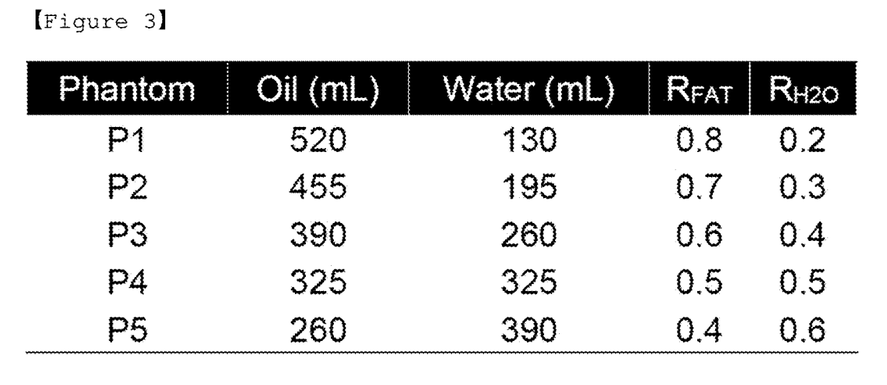
FIG. 3 is a diagram showing emulsion phantom compositions by volume as a table according to the predicted $R_{FAT}$ and $R_{H2O}$.

That is, referring to FIG. 3, FIG. 3 is a diagram showing emulsion phantom compositions by volume as a table according to the predicted $R_{FAT}$ and $R_{H2O}$.

In FIG. 3, the volumes of soybean oil and distilled water were measured separately, and the soybean lecithin was added at 2% of the volume weight of the oil for each phantom. Due to the high viscosity of the soybean lecithin, the oil was first heated to 60° C. and then used to transfer any lecithin that may remain attached to the side surface of a weighing beaker. The oil-lecithin mixture is sonicated (Bransonic CPX3800H-E, Emerson Electric, Danbury, CT) at 60° C. for 1 hour. For homogenization, in the related art, a vacuum chamber was used to remove air bubbles after blending. However, in one embodiment of the present disclosure, a blender with a built-in vacuum function (i8800, Jiaxiang Electric Co., LTD, Guangdong, China) was used.

Next, to describe the ex-vivo pig model, the inventors of the present disclosure were supplied with two porcine slabs corresponding to the abdominal area from a local slaughterhouse (each size of about 12×10×5 cm). The samples were kept at low temperatures during transport to the experimental field but were not frozen to prevent water loss, and then left until the slabs reached room temperature before measurement. Next, a DRS probe was mounted using an optical post and then positioned to be in contact with the sample during the measurement. At this time, two different measurement parts were selected from each of the porcine samples. Each measurement part was spaced from the edge of the sample by at least 3 cm to minimize light leakage during the measurement. The two measurement locations were spaced apart from each other by 3 cm, and after capturing the DRS data at both locations, a 3-cm cube on the center of each optical measurement point was resected. The resected tissue was immediately processed for MOI analysis.

Subsequently, to explain tissue moisture extraction, multiplicity of infection (MOI) fractions of the ex-vivo porcine tissue were determined using quantitative chemistry based on the method in the Association of Official Analytical Chemists (950.46 AOAC). In other words, 3-cm sections were each independently weighed using a high-precision balance (AS 220.R2, Radwag, Radom, Poland). Next, the samples were blended separately until homogenized, and the duplicates were extracted from each sample to weigh an aluminum dish. After heating the sample at 125° C. for 4 hours by being placed in a mechanical oven (Heratherm OMS60, Thermo Scientific, Waltham, MA), each sample was cooled in a desiccator (Nalgene 5312-0230, Thermo Scientific, Waltham, MA). The final weight of each sample was recorded using the high-precision balance, and the MOI was calculated according to Equation 4 below.

$$MOI = \left(\frac{\omega_{(s)i} - \omega_{(s)f}}{\omega_{(s)i}}\right) \quad \text{[Equation 4]}$$

In this case, $\omega_{(s)i}$ and $\omega_{(s)f}$ are an initial weight of the sample before heating and a final weight of the sample after heating, respectively.

Next, the results of the measurement, performed as above, will be described with reference to FIG. 4.

Figure 4:
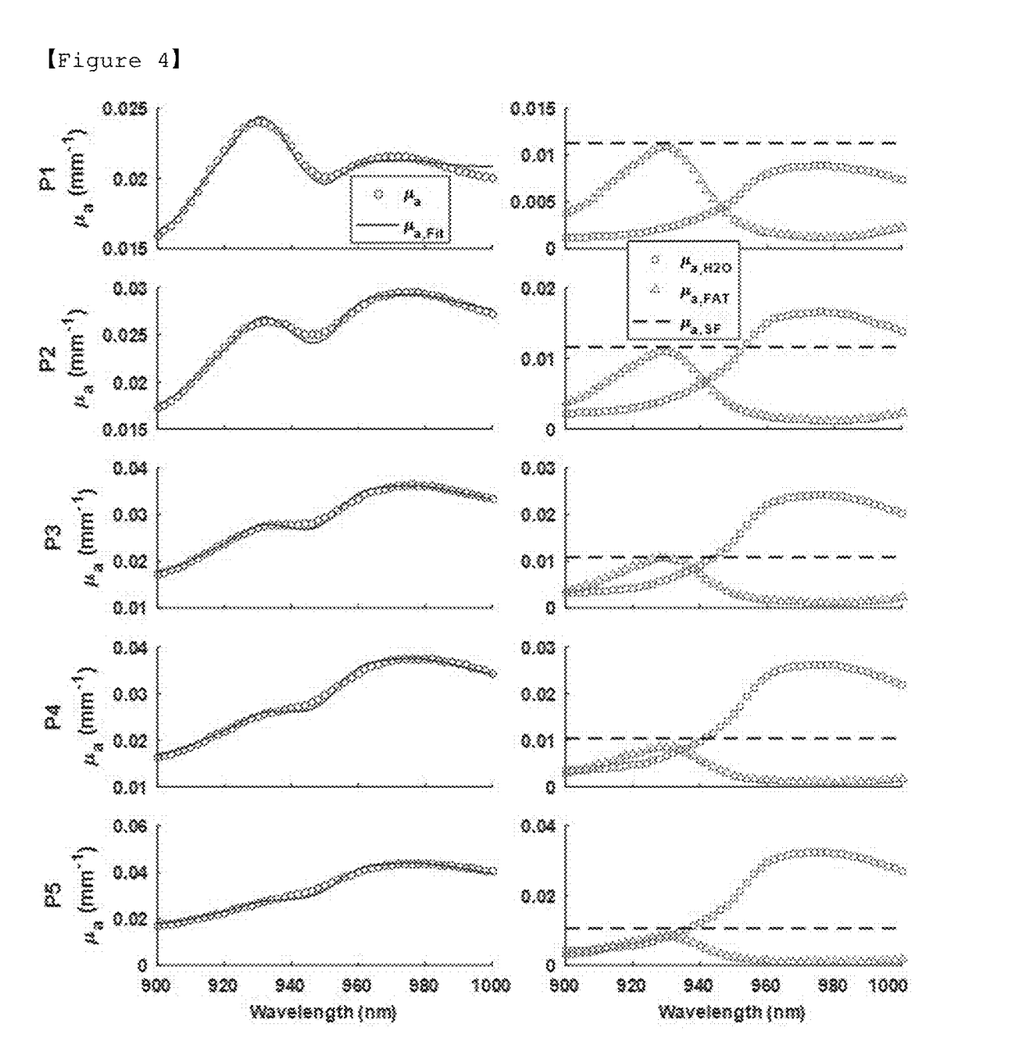
FIG. 4 is a diagram showing calculated relative absorption and fitting components.

That is, referring to FIG. 4, FIG. 4 is a diagram showing the calculated relative absorption and fitting components.

In FIG. 4, in the left column, the relative absorption coefficients are represented by circles, and the chromophore fitting results are represented by solid lines. In the right column, absorption contributions of chromophore for H2O and FAT are represented by squares and triangles, respectively, and SF is represented by a spectrally flat dotted line.

As shown in FIG. 4, the absorption spectrum and chromophore for each emulsion phantom are fit to wavelengths in a range of 900 to 1000 nm. For all data, $\mu'_s$ was set to 1.0 mm$^{-1}$. It was confirmed as the phantom series progressed, the water spectral peak at 976 nm increased compared to the lipid peak at 930 nm. In addition, the absorption contribution of each fitting component to the total absorption is also shown.

Figure 5:
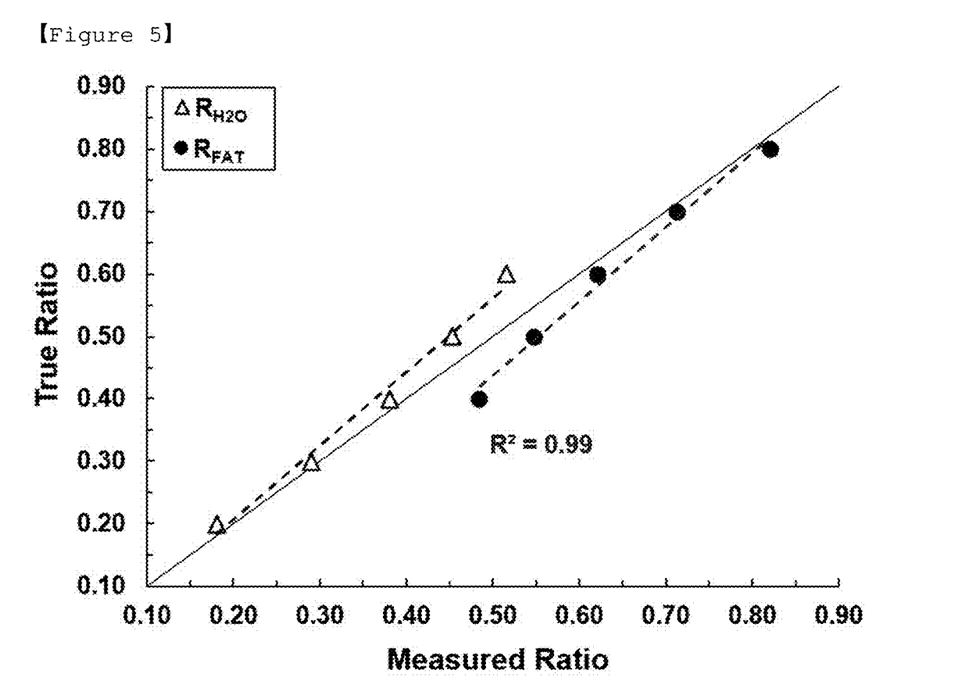
FIG. 5 is a diagram showing $R_{FAT}$ and $R_{H2O}$ values in comparison to the calculated expected values.

In addition, referring to FIG. 5, FIG. 5 is a diagram showing the recovered $R_{FAT}$ and $R_{H2O}$ values in comparison to the calculated expected values as shown in the table of FIG. 3.

FIG. 5 shows the results of comparing $R_{H2O}$ (represented by triangles) and $R_{FAT}$ (represented by circles) measured by performing measurements on five emulsion phantoms with varying $R_{H2O}$ and $R_{FAT}$ against the expected values represented by the solid lines. When compared to the true ratio, the average error was 3.7±3.0% for both parameters. As for $R_{FAT}$ and $R_{H2O}$, a trend line was calculated, and the coefficient of determination for the two metrics satisfies $R^2=0.99$.

That is, as shown in FIG. 5, the adipose-rich biological samples exhibited $R_{H2O}$ and $R_{FAT}$ approaching $C_{H2O}$ and $C_{FAT}$, respectively. In addition, highly linear trends were observed for both $R_{H2O}$ and $R_{FAT}$, compared to the expected value of the coefficient of determination $R^2=0.99$. In addition, the $R_{H2O}$ and $R_{FAT}$ errors, with respect to each parameter, were in a range of 1.1% to 8.4%, and the average error across the five emulsion phantoms was 3.7±3.0%.

In addition, the inventors of the present disclosure converted the calibrated reflectance into the absorption using Equation 2 described above.

Figure 6:
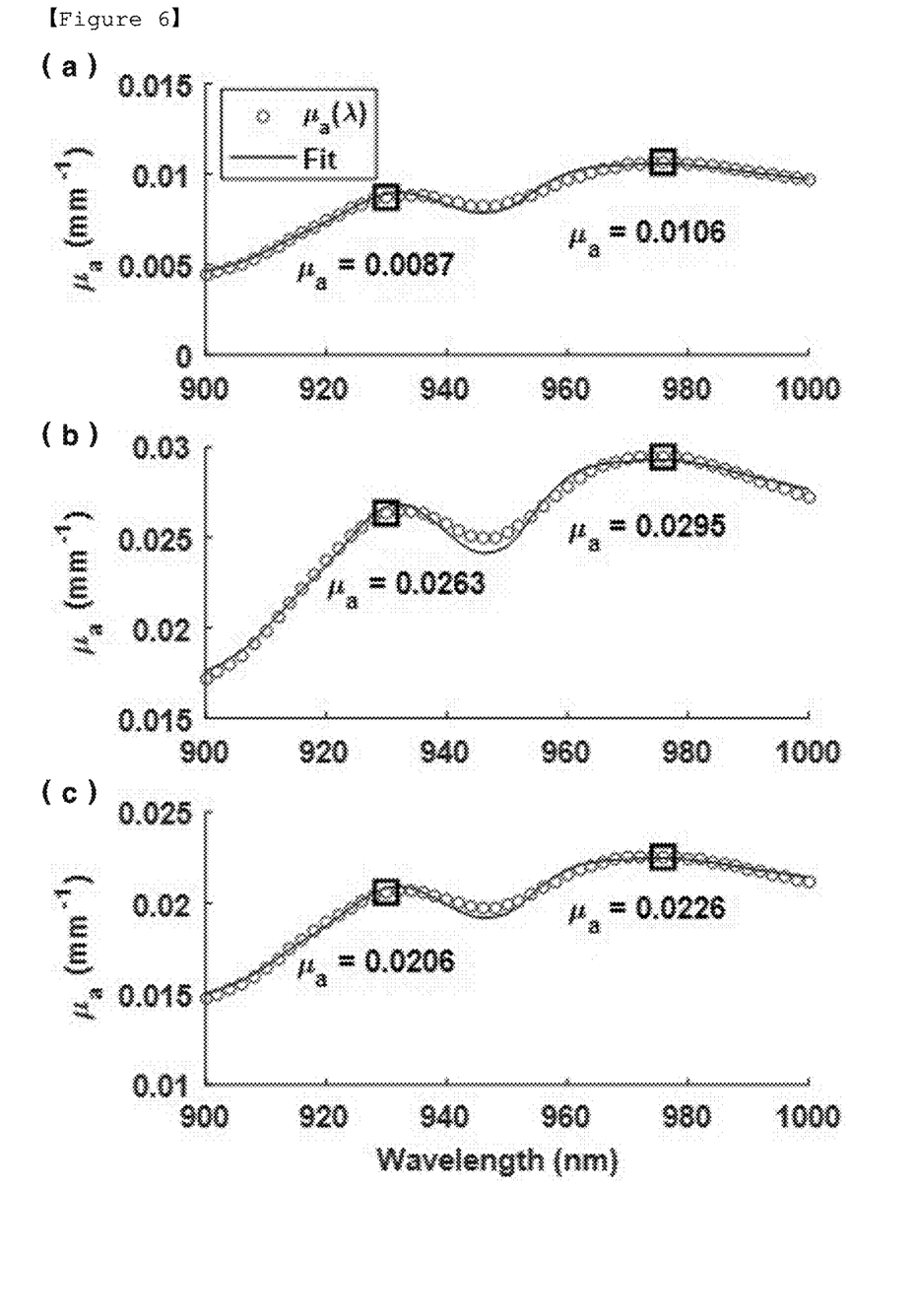
FIG. 6 is a diagram showing the effect of a variety of reduced scattering profiles on the absorption spectrum and chromophore fitting.

That is, referring to FIG. 6, FIG. 6 is a diagram showing the effect of a variety of reduced scattering profiles on the absorption spectrum and chromophore fitting.

In FIG. 6, absorption spectra are represented by circles, chromophore fitting results are represented by solid lines, and absorption values at the water and lipid peaks are marked with square markers.

In addition, FIGS. 6A, 6B, and 6C show the scattering measured using an FDPM device, the reduced scattering assuming $\mu'_s=1.0$ mm$^{-1}$, and the reduced scattering assuming $\mu'_s=2.0$ mm$^{-1}$, respectively.

As shown in FIG. 6, for phantom P2, three different values of the $\mu_a$ spectrum were used: a) a measured $\mu'_s$ derived from FDPM data, b) $\mu'_s=1.0$ mm$^{-1}$ assumed not to depend on wavelength, and c) $\mu'_s=2.0$ mm$^{-1}$ assumed not to depend on wavelength. In this case, not only the value of the pa spectrum but also the value of $\mu_a$ (at 930 nm) to $\mu_a$ (at 976 nm), which are the absorption peaks of FAT and H2O, respectively, is affected by the selection of $\mu'_s$.

Figure 7:
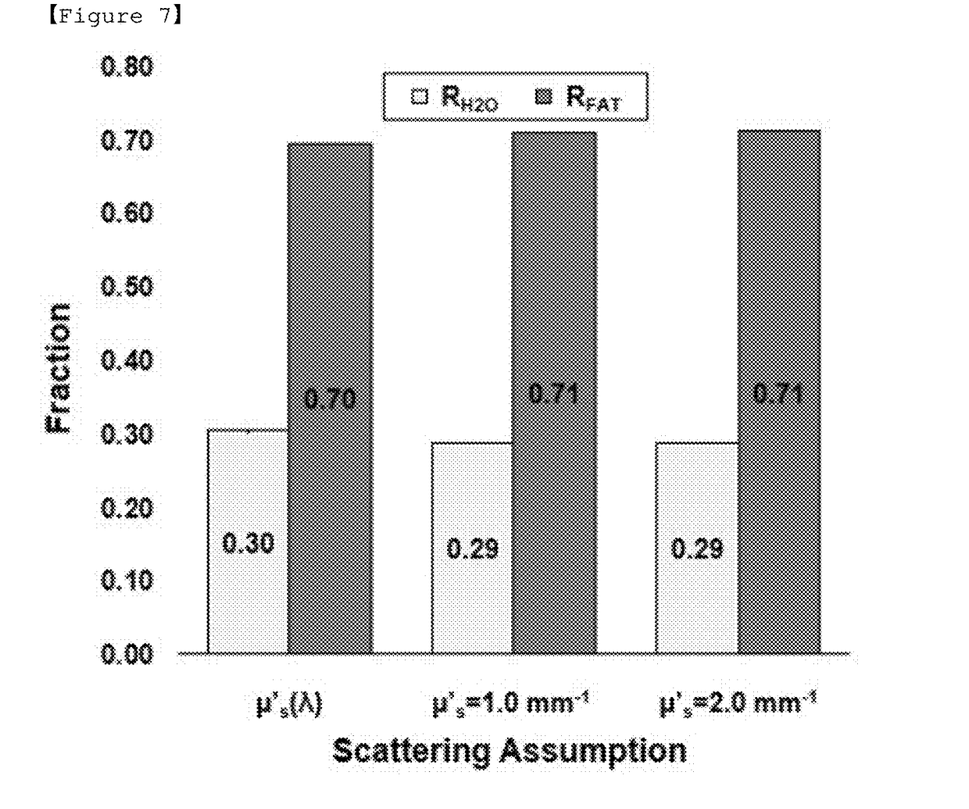
FIG. 7 is a diagram showing $R_{FAT}$ and $R_{H2O}$ values calculated based on P2 for each of the three scenarios with varying $\mu'_s$ assumptions.

In addition, referring to FIG. 7, FIG. 7 is a diagram showing $R_{H2O}$ and $R_{FAT}$ calculated based on P2 for each of the three scenarios having different $\mu'_s$ assumptions.

That is, FIG. 7 shows the $R_{H2O}$ and $R_{FAT}$ recovered from the data set in each case of 1) using the reduced scattering measured by FDPM, 2) assuming $\mu'_s$ to be 1.0 mm$^{-1}$, and 3) assuming $\mu'_s$ to be 2.0 mm$^{-1}$. As shown in FIG. 6 described above, although different $\mu'_s$ parameters generate different Pa spectra, the ratio of FAT to H2O remained consistently within 1%.

Figure 8:
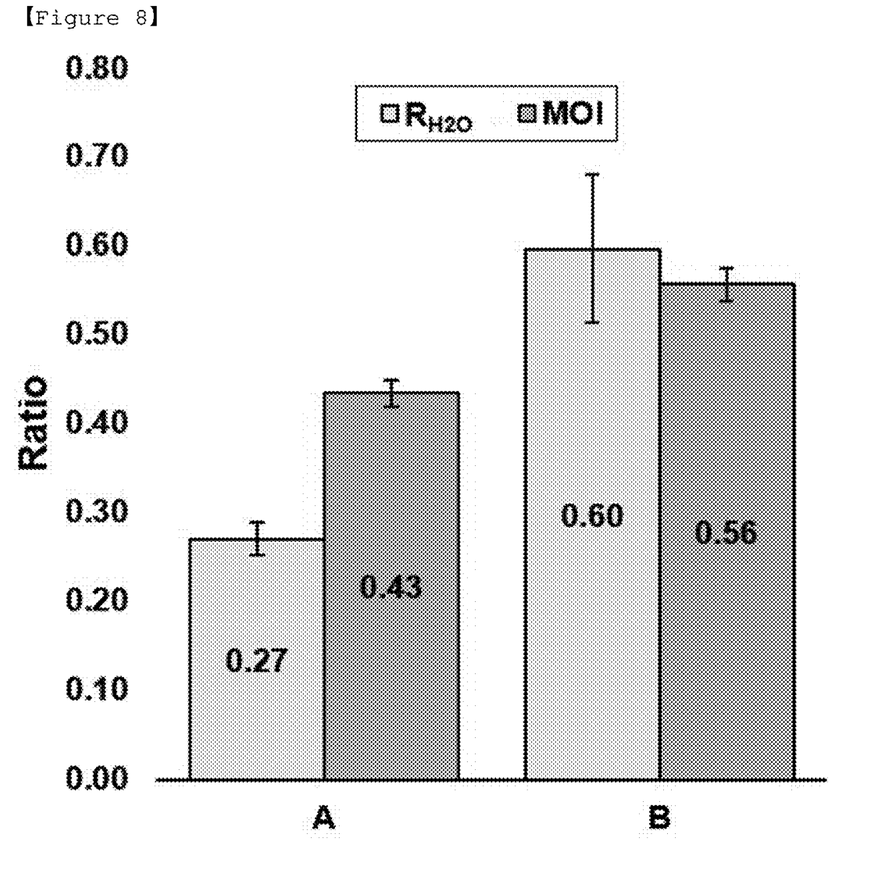
FIG. 8 is a diagram showing results of optically measuring ex-vivo pig samples at two different spatial locations.

Next, referring to FIG. 8, FIG. 8 is a diagram showing the results of optically measuring the ex-vivo pig samples at two different spatial locations.

In the case of FIG. 8, the MOI was calculated by resecting the tissue into a size of about 3 cm$^3$ from the center of each optical measurement. FIG. 8 shows $R_{H2O}$ calculated using the DRS technique (n=18 per sample) according to one embodiment of the present disclosure in comparison with the MOI (n=4 per sample) extracted by the analytical chemistry method.

As shown in FIG. 8, the inventors of the present disclosure dehydrated four porcine abdominal tissue samples for MOI calculation. In this case, while two samples were resected from abdomen A, the other two samples were collected from abdomen B. In addition, while abdomen A was observed to have a thick adipose surface layer, abdomen B was observed to be remarkably thin. The $R_{H2O}$ estimated using MOI and DRS derived by the analytical chemistry method is shown in FIG. 8.

As described above, in the present disclosure, a series of phantoms were prepared with varying water and fat ratios to evaluate the DRS method according to one embodiment of the present disclosure, which made $R_{H2O}$ and $R_{FAT}$ in the scattering media to be recovered. In addition, a wavelength region in a range of 900 to 1000 nm was selected to include 930 nm and 976 nm, known as the lipid and water absorption peaks, respectively.

In addition, while water and fat in the turbid medium are measured using a quantitative approach in the technical description presented in the document of the related art, the DRS technology, according to one embodiment of the present disclosure, is based on basic diffuse reflectance, in which the intensity of light relative to the wavelength is measured. Despite the lack of absolute optical properties, the shape of the intensity spectrum can still provide information regarding the chromophores in the sample measured to estimate water and fat.

Furthermore, although the $\mu_a$ spectra shown cannot be considered absolute due to the estimated scattering, as shown in FIG. 4, it is confirmed that the water peak rises compared to the lipid peak as the phantom series progresses, as expected. Moreover, the relative chromophore concentration can be recovered by fitting the linear combination of $C_{H2O}$, $C_{FAT}$, and SF, according to Equation 3.

In this case, the inclusion of SF enables the de-emphasis of the absolute value to fit the shape of the relative absorption spectrum. Nevertheless, attempts to directly determine the chromophore concentration in the relative spectrum cause inaccuracies in the values of water and lipids.

Therefore, in the present disclosure, the $R_{H2O}$ and $R_{FAT}$ parameters, the ratios based on the common relative absorption spectrum, are introduced. When comparing true values calculated from known ratios of oil and water using the DRS approach according to one embodiment of the present disclosure, the highly linear trend ($R^2$=0.99) was found to be well consistent with the expected results (error of 3.7±3.0%).

Furthermore, compared to the description of the related art using broadband DOS and time-domain DOS, the approach according to one embodiment of the present disclosure is similar in linearity and accuracy results. However, in the present disclosure, optical hardware with significantly lower complexity is used, and thus can be essentially composed only of a 100-nm light source (in a range of 900 nm to 1000 nm) and a spectrometer. Such hardware requirements can be further reduced through additional research on wavelength optimization when developing portable and wearable types of sensors based on the technology of the present disclosure.

In addition, the calibrated reflectance measurement may be related to absorption, as shown in Equation 1. However, in the present disclosure, the scattering profiles were assumed to calculate the relative absorption, without advanced information on the optical properties of the sample, and it was observed that the method, according to one embodiment of the present disclosure, is insensitive to the scattering assumptions.

That is, the selection of the scattering profiles affected the resulting absorption spectrum, but the final $R_{H2O}$ and $R_{FAT}$ results were changed only by a difference of 1%, which may be explained as follows.

First, $R_{H2O}$ and $R_{FAT}$, the ratios based on the same relative absorption spectrum, change smoothly and continuously, thus making the selection of scattering assumption affecting the absorption spectrum robust.

Second, as seen from the Mie theory, the wavelength dependence of $\mu'_s(\lambda)$ weakens as the wavelength increases, and the scattering profile is nearly flattened at a wavelength region in a range of 900 to 1000 nm. Thus, when implementing Equation 2, the effect of the $\mu'_s(\lambda)$ assumption is minimized unless a negative $\mu_a(\lambda)$ is calculated.

In addition, in one embodiment of the present disclosure, to verify the optically measured $R_{H2O}$ in the ex-vivo porcine sample, the water content was directly extracted from the tissue by the analytical chemistry method. To this end, the porcine tissues from two parts of "sample A" and "sample B" were used. "Sample A" was observed to have a much thicker upper-adipose layer (up to 2 cm) than "sample B" (up to 0.3 mm).

Furthermore, in one embodiment of the present disclosure, more than 95% of the average optical penetration depth and optical signal in the source-detector configuration were likely to be included within 1 cm after being incident on the sample. However, a much larger volume of 3 cm$^3$ was removed from each of the samples to ensure the sufficient mass of the samples for dehydration calculation and the MOI analysis.

Therefore, some discrepancies between $R_{H2O}$ and MOI may be explained by the difference in analysis volume. Regarding sample A, the DRS sensitivity might be limited to the top adipose layer with high-fat and low-water contents. On the other hand, lean tissue was included in the MOI analysis.

Indeed, $R_{H2O}$ for sample A is consistent with the description in the related art showing a water fraction ratio in a range of 0.15 to 0.3 in abdominal adipose tissue. An MOI value of 0.43 is likely to indicate a mixed fat-muscle composition. In the case of sample B, the samples predominantly contained lean tissue due to the presence of thinner fat, so the tissue volumes for both optical and MOI extraction methods were closely consistent.

As described above, in one embodiment of the present disclosure, the inventors of the present disclosure proposed the narrowband DRS method using the near-infrared rays (NIR) having a wavelength region in a range of 900 to 1000 nm. The narrowband DRS method was configured such that body composition, such as the water and lipid contents in local tissue, can be accurately measured, and the simplified hardware configuration thus enables mass production and sales. The performance of the proposed method was confirmed using the emulsion phantoms with various mixtures of water and lipids.

At the same time, it was shown that the measurement items were not sensitive to the scattering assumption, so the need for absolute quantification of scattering was eliminated. As a result, the present disclosure was proven to have the advantage of robustness against the absolute scattering assumption. In addition, with performing direct water extraction was performed by the analytical chemical method using the ex-vivo porcine sample and comparing the DRS results of the present disclosure, it was proven that the DRS method proposed in the present disclosure was able to be applied not only to the field of medicine but also to fitness, personal, and home use.

Therefore, from the above description, the method for quantifying the water and lipid contents in the turbid media using narrowband diffuse reflection spectroscopy, according to one embodiment of the present disclosure, is easily implementable. That is, referring to FIG. 9, FIG. 9 is a flowchart schematically showing the overall configuration and process flow of the method for quantifying the water and lipid contents in the turbid media using the narrowband diffuse reflectance spectroscopy according to one embodiment of the present disclosure.

Figure 9:
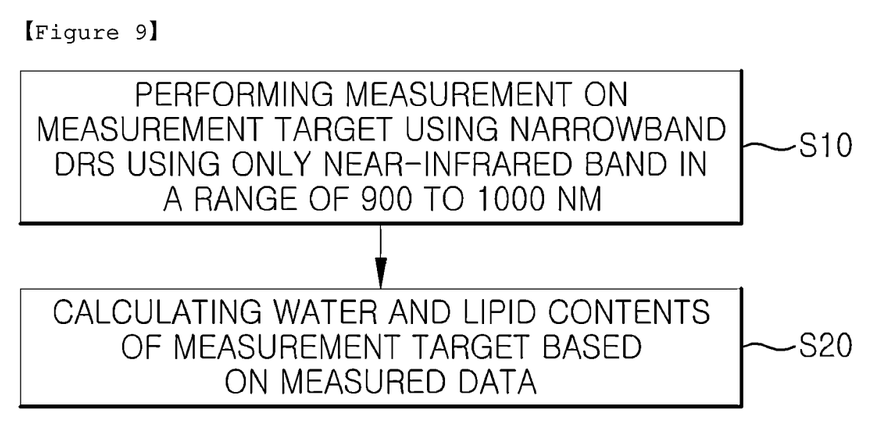
FIG. 9 is a flowchart schematically showing the overall configuration and process flow of a method for quantifying water and lipid contents in a turbid medium using narrowband diffuse reflectance spectroscopy according to one embodiment of the present disclosure.

As shown in FIG. 9, the method for quantifying the water and lipid contents in the turbid media using the narrowband diffuse reflectance spectroscopy, according to one embodiment of the present disclosure, may be configured to be mainly divided into: step S10 of measuring a diffuse reflectance of a measurement target by positioning the measurement target on a DRS measuring device, configured to perform DRS measurement on the measurement target using laser light; and step S20 of analyzing collected measurement data measured in the measuring step S10 to calculate the water and lipid contents of the measurement target.

In this case, in the measuring step S10, the measurement is performed using the DRS measuring device, configured as described above with reference to FIG. 1. At this time, the DRS measuring device may be configured such that FDPM measurement is performed on the measurement target using only a near-infrared band in a range of 900 to 1000 nm.

In addition, the analyzing step S20 is configured such that a process of calculating the water and lipid contents of the measurement target is performed based on the measurement data measured in the measuring step S10, using dedicated hardware, or preferably, a data processing means, such as a computer, as described above with reference to FIG. 2 and Equations 1 to 3.

Therefore, the method for quantifying the water and lipid contents in the turbid media using the narrowband diffuse reflection spectroscopy, according to one embodiment of the present disclosure, may be implemented, as configured above, thereby providing the method for quantifying the water and lipid contents in the turbid media using the narrowband diffuse reflectance spectroscopy (DRS) according to the present disclosure. The narrowband DRS is configured such that the water and lipid contents can be accurately quantified using the diffuse reflectance spectroscopy (DRS) based on near-infrared rays. Thus, problems in existing apparatuses and methods for measuring body composition, which have failed to provide methods capable of quantifying the water and lipid contents through non-invasive methods in turbid media, such as bodily tissues, in which scattering occurs upon penetration of near-infrared rays (NIR), can be solved.

In addition, according to the present disclosure, provided is the method for quantifying the water and lipid contents in the turbid media using the narrowband diffuse reflectance spectroscopy (DRS), which uses only the near-infrared band in a range of 900 to 1,000 nm, as described above. The narrowband DRS is configured such that the water and lipid contents can be accurately quantified in the tissue through a simpler configuration than that in existing methods. As a result, problems in existing spectroscopy, which use frequency-domain and time-domain diffuse optical spectroscopy (DOS) or infrared spectroscopy to measure the water and fat contents in tissue, whereby there are limitations that hardware configurations become complicated and mass production, and sales are subject to certain constraints, as well as in apparatus and methods for measuring body composition, based on the same, can be solved.

As described above, the details of the method for quantifying the water and lipid contents in the turbid media using the narrowband diffuse reflectance spectroscopy, according to the present disclosure, have been described through embodiments of the present disclosure. However, the present disclosure is not limited to the embodiments described above. Therefore, it will be appreciated that various modifications, changes, combinations, and substitutions may be made by those skilled in the art to which the present invention belongs, according to design needs and various other factors.

The invention claimed is:

1. A method for quantifying water and lipid contents in a turbid medium using narrowband diffuse reflectance spectroscopy configured such that the water and lipid contents in a tissue are able to be accurately quantified in the turbid medium, in which scattering occurs upon penetration of near-infrared rays (NIR), using diffuse reflectance spectroscopy (DRS) based on the near-infrared rays (NIR),
wherein the method is configured to be performed using
  a data processing means, including a computer or dedicated hardware, through a process comprising:
measuring a diffuse reflectance of a measurement target using diffuse reflectance spectroscopy (DRS); and
analyzing collected measurement data measured in the measuring to calculate water and lipid contents of the measurement target,
wherein in the measuring, frequency-domain photon migration (FDPM) measurement is configured to be performed on the measurement target by using only a near-infrared band in a range of 900 to 1000 nm,
wherein the analyzing is configured such that when a theoretical reflectance of the measurement target is referred to as R, a measured reflectance is referred to as Rm, absorption of the measurement target is referred to as $\mu_a$, and reduced scattering of the measurement target is referred to as $\mu'_s$ ($\mu'_s \gg \mu_a$), a process of selecting $\mu_a$ and calculating a $\mu_a$ spectrum so that a difference between the theoretical reflectance (R) and the measured reflectance (Rm) is minimized is performed by using Equation 1, assuming $u'_s = 1.0$ $mm^{-1}$, and applying a numerical solver, including MATLAB function fzero, $$\text{fzero}[R_m(\lambda) - R(\lambda, \mu_a)] \qquad \text{[Equation 1]}.$$

2. The method of claim 1, wherein the measuring is configured to be performed using a DRS device configured to comprise:
  a polylactic acid (PLA) probe mounted with a source optical fiber connected to a light source and a detection optical fiber of a spectrometer and having a form in which the source optical fiber and the detection optical fiber are spaced apart from each other by a predetermined distance; and a barrier formed of a transparent plastic with a predetermined thickness, the barrier positioned between the PLA probe and a surface of the measurement target to prevent the measurement target and each of the source optical fiber and the detection optical fiber from making contact.

3. The method of claim 1, wherein the analyzing is configured such that each process of calculating a water concentration ($C_{H2O}$) and a lipid concentration ($C_{FAT}$) of the measurement target is performed by comparing the $\mu_a$ calculated using Equation 1 and an absorption spectrum $\mu_{a,fit}$ predicted using Equation 2, using a least-square minimization (LSM) method, $$\mu_{a,fit} = \varepsilon_{H2O} C_{H2O} + \varepsilon_{FAT} C_{FAT} + SF \qquad \text{[Equation 2]}$$

wherein $C_{H2O}$, $\varepsilon_{H2O}$, $C_{FAT}$, $\varepsilon_{FAT}$, and SF mean a concentration of H2O, an extinction coefficient of H2O, a concentration of FAT, an extinction coefficient of FAT, and a scaling factor, respectively.

4. The method of claim 3, wherein the analyzing is configured such that when a water fraction ratio of the measurement target is referred to as $R_{H2O}$ and a fat fraction ratio of the measurement target is referred to as $R_{FAT}$, each process of calculating the water fraction ratio and the fat fraction ratio of the measurement target is performed using Equation 3, $$R_{H2O} = \frac{C_{H2O}}{(C_{H2O} + C_{FAT})}, R_{FAT} = \frac{C_{FAT}}{(C_{H2O} + C_{FAT})}. \qquad \text{[Equation 3]}$$

5. A method for measuring a body composition, the method comprising:
constructing a body composition measurement system configured to measure water and lipid contents of a measurement target using the method of claim 1; and
measuring the water and lipid contents of the measurement target using the body composition measurement system.

* * * * *